June 4, 1963
J. F. SUESSLE
3,092,175
FASTENING DEVICE
Filed Aug. 10, 1959
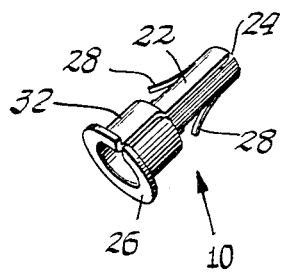
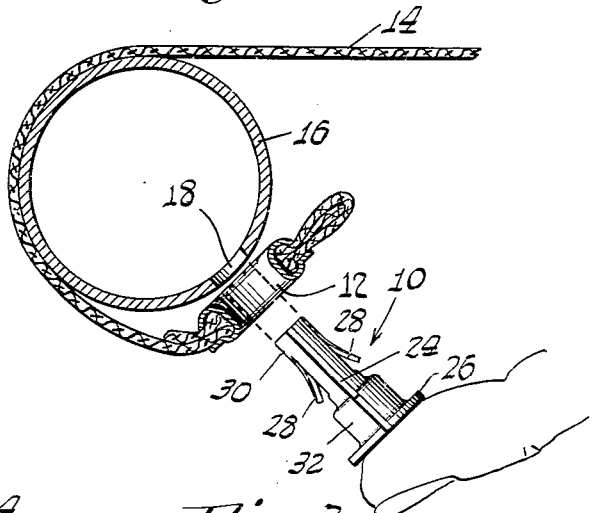
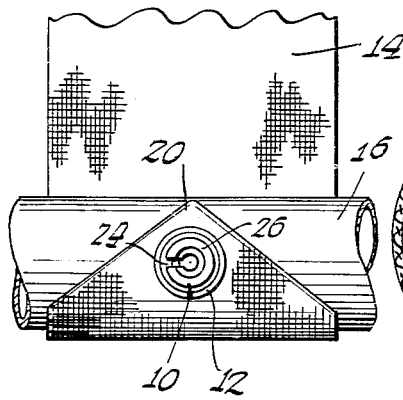
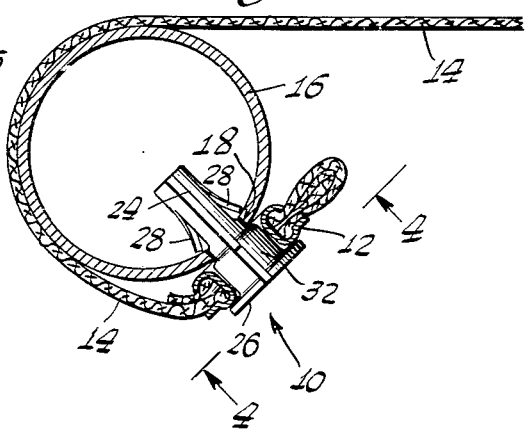
INVENTOR.
Joseph F. Suessle
BY
Munn, Liddy, Daniels & March
ATTORNEYS United States Patent Office 3,092,175
Patented June 4, 1963

3,092,175
FASTENING DEVICE
Joseph F. Suessle, Pelham Manor, N.Y., assignor to Edwin B. Stimpson Company, Inc., Brooklyn, N.Y., a corporation of New York
Filed Aug. 10, 1959, Ser. No. 832,789
1 Claim. (Cl. 160—390)

This invention relates to fastening devices, and more particularly to pin or stud type fasteners which are intended to be inserted in the holes of perforated members to secure objects to the said members.

The invention is illustrated in connection with the attachment of webbing to supporting frames, such as is encountered in the fabrication of furniture constituted of plastic webs or strips and tubular metal frame members, such furniture being commonly known as "aluminum furniture."

In the manufacture of aluminum and similar metallic-frame furniture it has been common practice to secure the webs or strips, which are usually woven of plastic fibers, to the metal framework by folding the ends of the strips back on themselves for a short distance, perforating the folded thickness of the strip, inserting an eyelet in the perforated strip and clinching over the eyelet to secure the folded strip portions together; thereafter a screw was passed through the eyelet, as for example a sheet metal screw, to secure the folded end of the webbing to the metal frame. In enabling this construction to be followed, at appropriate points the metal frame is perforated, and the sheet metal screws are threaded into the perforations or holes, forming their own threads and securing the webbing in place on the frame.

While this practice has resulted in a satisfactory article, it has involved an appreciable amount of time and labor, in first placing the screws through the eyelets and thereafter threading the screws into the tubular frame or similar supporting structure. Not only has this operation been time consuming, but it has required the use of special tools or screwdrivers which were generally of the power-driven type, in an effort to speed-up the assembly.

The above procedure thus required a certain amount of more or less costly equipment, a source of power for the same, and still consumed an appreciable amount of time, resulting in relatively high labor and assembly costs.

An object of the present invention is to obviate the drawbacks and disadvantages of the above-mentioned assembly procedure, and one object of the invention is to provide a novel and improved fastening pin or device for use with the eyeletted ends of plastic or similar strips or webbing as used in furniture to secure the said ends to the perforated frame members of the furniture, the said fastening means or pin obviating the necessity for tools of any type, either hand tools or power tools, and enabling the fastening operation to be carried out very easily and rapidly entirely by hand, thereby to greatly speed up the assembly of aluminum or metal furniture and reduce assembly and labor costs to a minimum.

Another object of the invention is to provide a novel and improved manually attachable fastening means as above set forth, which is of simple one-piece construction whereby it may be easily and economically fabricated.

A further object of the invention is to provide an improved one-piece manually attachable fastening pin in accordance with the foregoing, which is of resilient construction and has a snap-action when being applied, the said pin becoming automatically locked in place after its application whereby it will be permanently held and will permanently secure the webbing to the supporting framework.

A feature of the invention resides in the provision of an improved manually attachable spring-action fastening pin as characterized, which may be readily fabricated in large quantities as a stamping or eyelet-machine product, utilizing automatic progressive tooling, thereby to minimize the waste material produced in its fabrication and to effect a desirable economy of manufacture.

Another feature of the invention resides in the provision of a novel, manually attachable fastening pin, which may prior to its manual attachment be inserted in and carried by the webbing which is to be secured in place, such insertion being done either manually or else by automatic equipment, thereby to obviate the necessity for applying the individual fastener pins to the webbing at the time that the latter is to be secured to the supporting framework of the furniture.

Yet another feature of the invention resides in the provision of a simple, manually attachable fastening pin of resilient construction wherein the pin body itself, together with resilient projections carried thereby, are all yieldable during the attachment of the pin, the said yieldable parts springing back substantially to their original positions and shapes upon completion of the attaching operation, to securely lock the pin in its fastening position.

Other features and advantages will hereinafter appear.

In the accompanying drawings:

FIG. 1 is a perspective view of an improved manually attachable fastening pin as provided by the invention.

FIG. 2 is a view partly in section, taken through a furniture frame member and a strip of webbing, and partly in side elevation (the elevation being of the fastening pin) illustrating the manner of attachment of the pin where the latter is not initially inserted in and carried by the webbing.

FIG. 3 is a view like FIG. 2, but showing the completion of the attaching operation.

FIG. 4 is a fragmentary elevational view, looking in the direction of the arrows 4, 4 of FIG. 3.

Referring now particularly to the drawings, the improved fastener pin as provided by the invention is indicated generally by the numeral 10, said pin being shown in FIGS. 3 and 4 as passing through an eyelet 12 carried by a flexible strip or webbing 14 which has been passed around a tubular frame member 16, such as is commonly employed in aluminum furniture and the like.

The pin 10 in FIGS. 3 and 4 is shown as having been manually pressed into a hole 18 of the tubular frame member, and as being securely, permanently held in place on the frame member. As seen in FIG. 4, the end portions of the webbing 14 have been folded back to effect a pointed end 20, and the said pointed end has been perforated and secured against unfolding by the application of the eyelet 12 to the perforation or hole therein.

Considering now specifically FIGS. 1 and 2, the fastener pin 10 is constituted of a tubular body 22 which has in one side a through longitudinal cut 24 extending from one end of the body 22 to the other. The tubular body 22 is advantageously constituted of sheet metal, being preferably formed as a metal stamping by punch press operations, such may be automatically carried out in an eyelet machine. With such construction, the provision of the longitudinal through cut 24 enables the body 22 to be radially compressed or reduced in diameter, which is an important characteristic of the present fastener pin, as will be explained later in detail.

The body 22 has a shoulder means 26 in the form of an outwardly projecting annular flange or shoulder at one end, said flange constituting a head on the pin and having an expansive surface presented at the end of the body for engagement with the fingers when the pin is being inserted in the perforated member, as illustrated clearly in FIG. 2.

The pin body 22 further has a pair of resilient prongs 28, which are preferably lanced from diametrically opposite portions of the body and are symmetrically disposed with respect to the through cut 24, the prongs 28 extending angularly, outward and generally in the direction of the head 26, and being attached to the body 22 at locations remote from the said head. As shown in the figures, the prongs 28 have their support in the body 22 adjacent the small end thereof, and preferably the said small end 30 of the body 22 has a straight or cylindrical lead portion to facilitate its insertion in the aligned eyelet 12 and perforation 18, as seen in FIG. 2, or else to merely facilitate its insertion in the perforation 18 if the pin 10 should be initially carried by the webbing 14 to effect a more rapid assembly of the latter to the tubular frame structure.

Referring further to FIGS. 1 and 2, the pin body 22 has a portion 32 of enlarged diameter adjacent the head 26, for engagement with the webbing 14 and more specifically with the eyelet carried by the said webbing. The normal or unstressed diameter of the enlarged portion 32 is preferably slightly greater than the inside diameter of the eyelet 12, the pin 10 may be inserted in the eyelet 12 and slightly compressed thereby to effect a friction retention of the pin 10 in the end of the webbing 14 and this operation may be carried out either manually or else by automatic machinery, thereby to facilitate and speed up the actual attachment of the webbing to the frame structure. As is best seen in FIGURE 3, when the pin body 22 is slightly compressed by the seating of the portion 32 in grommet 12, its overall normal diameter of the small end 30 of the pin including the free ends of the prongs 28, is not greater than the interior diameter of the grommet 12. This arrangement permits a defective pin to be readily removed from grommet 12 prior to insertion of the small end 30 in tubular member 16.

Thus, where webbing is supplied with the fastener pin 10 already applied to it the operator, to effect the attachment of the webbing to the frame structure need only bring the lead end 30 of the pin into the perforation 18 of the frame member, and then press the pin 10 in place by applying finger pressure to the large face of the head 26 of the pin. As the pin is forced into the perforation 18, the resilient prongs 28 will flex inward and the entire body 22 will also be radially compressed or reduced in diameter, until the prongs 28 pass by the hole 18. Upon this occurring, the prongs 28 will snap outward, and the body 22 will also spring outward or resume its normal diameter except for the slight compression effected by the eyelet 12. The finish of the assembly operation is illustrated in FIG. 3, and the eyelet 10 when in this position will securely, permanently fasten the webbing 14 to the frame member 16.

It will be understood from the foregoing that I have provided a simple and improved pin-type fastening device which is especially adapted for use in securing webbing and the like to frame members such as those encountered in aluminum and other metal furniture. My fastening device is seen to be of extremely simple construction, and may be fabricated economically in quantities by existing automatic press equipment. The fastening pin may be initially frictionally carried by the perforated and eyeletted webbing, and its attachment to the frame structures requires neither manual nor power-operated tools but instead may be quickly and easily effected by the application of manual pressure to the face of the head 26, as for example is illustrated in FIG. 2. The fastening is permanent, and the large-diameter portion 32 of the pin in conjunction with the eyelet 12 which is crimped over the folded portions of the webbing 14 will effect a secure retention of the webbing on the frame members 16.

Variations and modifications may be made within the scope of the claim, and portions of the improvement may be used without others.

I claim:

The combination of a tubular frame member having a perforation formed therein, a length of webbing having an opening and an eyelet disposed in said opening and secured to the webbing; and a fastener pin comprising a resilient, elongate, tubular body having a through longitudinal cut extending from one end of said pin to the other, said body having an integral, radially outwardly extending head at one end, a first portion of relatively small diameter at the other end, a second portion of intermediate diameter adjacent said head and disposed within said eyelet with said head engaging one side of said eyelet, the length of said second portion being substantially equal to the axial thickness of said eyelet, the nominal diameter of said second portion being slightly greater than the inner diameter of said eyelet to provide a pressure fit therein, an annular shoulder joining said first and second portions, a locking prong projecting from said first portion of said body at an angle to the axis thereof, the diameter of said first portion including said prong being not greater than the interior diameter of said grommet when said second portion is seated therein, the outermost end of said prong being the end closer to said head and being axially spaced from said shoulder whereby when inserted through said perforation in said frame member the latter is grasped between said shoulder and the outermost end of said prong, said prong being resilient to yield radially inwardly upon being pressed by hand through said perforation in said frame member, said prong springing back when the same has passed through the opening, thereby to lock the pin in said frame member.

References Cited in the file of this patent

UNITED STATES PATENTS

| 2,174,995 | Osborne | Oct. 3, 1939 |
| 2,585,485 | Miller | Feb. 12, 1952 |
| 2,672,107 | Widman | Mar. 16, 1954 |
| 2,737,232 | Gruber | Mar. 6, 1956 |
| 2,741,938 | Johnsonson | Apr. 17, 1956 |
| 2,913,793 | Tallarico | Nov. 24, 1959 |
| 2,979,119 | Kramer | Apr. 11, 1961 |